United States Patent [19]

Chen

[11] Patent Number: 5,606,450
[45] Date of Patent: Feb. 25, 1997

[54] MOVABLE REFLECTIVE PANEL FOR AN OPTICAL SCANNER

[75] Inventor: Jyh M. Chen, Taoyuan, Taiwan

[73] Assignee: Acer Peripherals, Inc., Taoyuan, Taiwan

[21] Appl. No.: 639,864

[22] Filed: Apr. 26, 1996

[51] Int. Cl.$^6$ ............................................. G02B 26/08
[52] U.S. Cl. ........................... 359/223; 359/196; 358/474; 358/487; 250/234; 399/151
[58] Field of Search ................................. 359/196, 197, 359/201, 205, 209–212, 223; 355/51, 65, 66, 67, 233–235; 358/474, 487, 494, 497; 250/234, 235

[56] References Cited

U.S. PATENT DOCUMENTS

| | | | |
|---|---|---|---|
| 5,119,212 | 6/1992 | Mori et al. | 358/474 |
| 5,282,081 | 1/1994 | Chen et al. | 359/223 |
| 5,392,100 | 2/1995 | Yoshida | 355/235 |

*Primary Examiner*—James Phan
*Attorney, Agent, or Firm*—The Kline Law Firm

[57] ABSTRACT

A movable reflective panel is devised for an optical scanner to facilitate the scanning of a document from underside so that there is no need to place an opaque panel above the document. The optical scanner comprises a base housing having a transparent top, an upper housing pivotally mounted on the base housing above the transparent top, a scanning mechanism movably mounted within the base housing for scanning an image-bearing document positioned on the transparent top. The scanning mechanism comprises a light source for emitting light to the document from underside, an optical sensor for transforming light into corresponding electric signals, and optical means for transmitting light reflected from the document along a predetermined optical path to the optical sensor. The optical scanner further comprises a reflective panel movably mounted within the upper housing which moves in parallel with the scanning mechanism for reflecting light transmitted through the document back to the scanning mechanism along the optical path so as to enhance the light received by the optical sensor.

3 Claims, 1 Drawing Sheet

MOVABLE REFLECTIVE PANEL FOR AN OPTICAL SCANNER

BACKGROUND OF THE INVENTION

1. Field of the Invention

The present invention relates to an optical scanner, and more particularly, to a reflective mechanism of an optical scanner for reflecting light transmitted through a document.

2. Description of the Prior Art

Optical scanners equipped with an upper light source for scanning transparent documents such as color transparencies are commonly seen in the market. Such scanner usually comprises a base housing with a transparent top, a scanning mechanism movably mounted within the base housing equipped with a light source for scanning an image-bearing document positioned on the transparent top from underside if the document is opaque, and an upper housing pivotally mounted on the base housing above the transparent top with a movable light source for emitting light to the document from its top side if the document is transparent.

One problem is found when scanning some semi-transparent papers such as tracing papers by using such scanner. If the document is scanned by using the light source in the base housing, a lot of light received by the document will transmit through the document instead of reflecting back to the scanning mechanism and thus greatly reduces the acceptability of the resulting image or even makes the scanning impossible. It is also improper to use the light source in the upper housing to emit light to the document because a semi-transparent document is not transparent enough to allow enough light to pass through. In such case a user must use the light source in the base housing and place an opaque panel such as a white plastic board or a white paper above the semi-transparent document in order to reflect the light transmitted through the document back to the scanning mechanism. But adding an opaque panel usually complicates the document scanning work. First of all, such opaque panels are not always available when scanning those semi-transparent documents. Second, adding an opaque panel usually requires extra document alignment works to make sure that the document covered under the opaque panel is correctly aligned.

SUMMARY OF THE INVENTION

It is therefore a primary objective of the present invention to provide a new reflective mechanism to solve the problems caused by the opaque panel so as to facilitate the scanning of a semi-transparent document.

Briefly, in a preferred embodiment, the present invention include an optical scanner comprising:

(1) a base housing having a transparent top, (2) an upper housing pivotally mounted on the base housing above the transparent top, (3) a scanning mechanism movably mounted within the base housing for scanning an image-bearing document positioned on the transparent top; the scanning mechanism comprising a light source for emitting light to the document from underside, an optical sensor for transforming light into corresponding electric signals, and optical means for transmitting light reflected from the document along a predetermined optical path to the optical sensor, and (4) a reflective panel movably mounted within the upper housing which moves in parallel with the scanning mechanism for reflecting light transmitted through the document back to the scanning mechanism along the optical path so as to enhance the light received by the optical sensor.

It is an advantage of the present invention that if the image-bearing document is a semi-transparent document, most of the light transmitted through the document is reflected back to the document again by the reflective panel in the upper housing so that there is no need to place an opaque panel above the document to reflect the light anymore.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
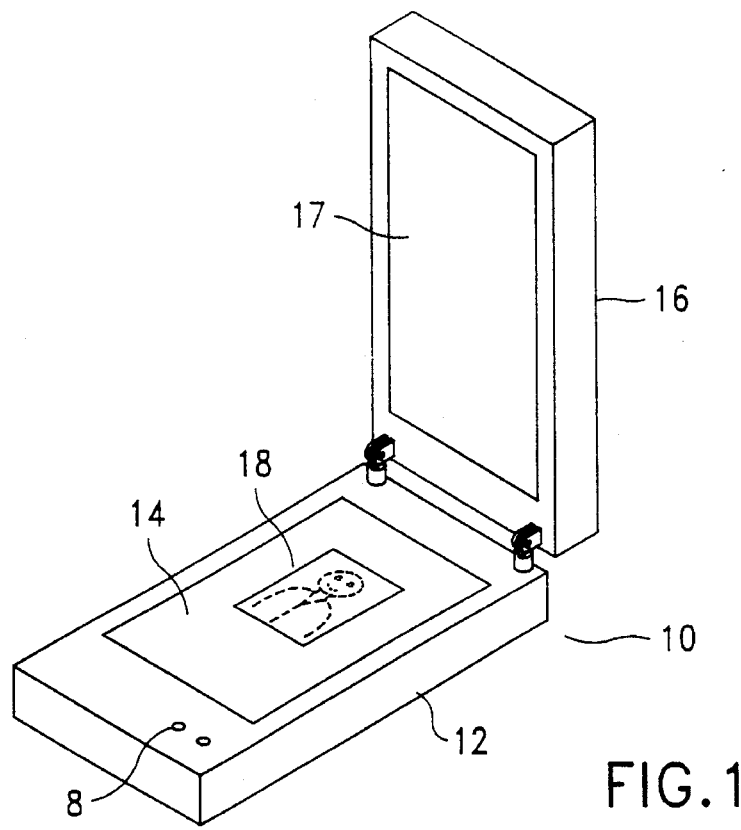
FIG. 1 is a perspective view of an optical scanner according to the present invention.

FIG. 1 is a perspective view of an optical scanner 10 according to the present invention. The scanner 10 comprises a base housing 12 having a transparent top 14, an upper housing 16 pivotally mounted on the base housing 12 having a transparent bottom 17, and two push buttons 8 for controlling the scanner 10. An image-bearing document 18 is positioned on top of the transparent top 14 facing downward and ready to be scanned by the scanner 10.

Figure 2:
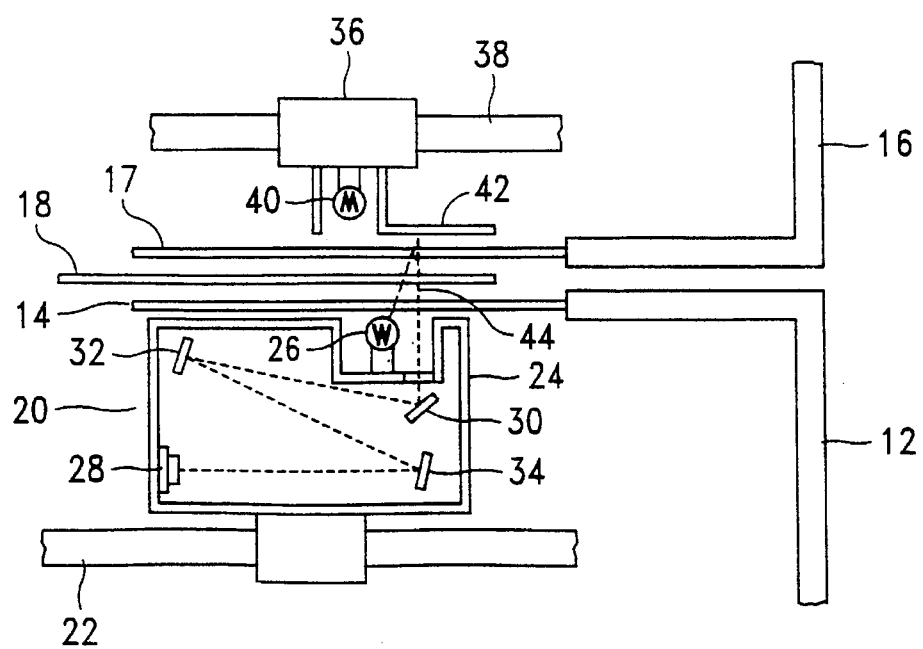
FIG. 2 is a sectional view which shows part of the internal construction of the optical scanner shown in FIG. 1.

FIG. 2 is a sectional view which shows part of the internal construction of the optical scanner 10 shown in FIG. 1. The document 18 is clamped between the base housing 12 and the upper housing 16 ready to be scanned by the scanner 10. Within the base housing 12, there is a scanning mechanism 20 movably mounted over a shaft 22 for scanning the document 18 positioned on the transparent top 14. The scanning mechanism 20 comprises a frame 24 movably mounted on the shaft 22, a light source 26 mounted on the frame 24 for emitting light to the document 18 from underside, an optical sensor 28 which is a charge couple device mounted on the bottom of the frame 24 for transforming light into corresponding electric signals for further processing, and an optical means which comprises three reflective mirrors 30, 32 and 34 mounted on the frame 24 for transmitting light reflected from the document 18 along a predetermined optical path 44 to the optical sensor 28. The scanning mechanism 20 is driven along the shaft 22 by a motor (not shown) which is controlled by a microprocessor (not shown) built in the base housing when scanning the document 18.

The upper housing 16 comprises a frame 36 movably mounted on a shaft 38, a light source 40 mounted on the frame 36 above the transparent bottom 17 for emitting light to the document 18 from above, and a reflective panel 42 installed on the lower end of the frame 36 for reflecting light emitted from the light source 26 back to the scanning mechanism 20. The frame 36 is driven by a motor (not shown) along the shaft 38 and moves in parallel with the scanning mechanism 20 when scanning the document 18. The reflective panel 42 is a white panel horizontally positioned above the document 18 for reflecting light emitted from the light source 26 of the scanning mechanism 20 along the optical path 44 so as to enhance the light received by the optical sensor 28.

If the document 18 is an opaque or semi-transparent document, the light source 26 will be used to emit light to the document 18 from underside. In this case the light source 40 of the upper housing 16 will be turned off and the reflective panel 42 is positioned along the optical path 44 right above the reflective mirror 30 for reflecting light transmitted through the document 18 back to the document 18 so that more light will be reflected back to the optical sensor 28 of the scanning mechanism 20 along the optical path 44. If the document 18 is a color transparency or a X-ray film which can only be scanned by using the light source 40 from above, the light source 26 will be turned off and the light source 40 will be turned on and moved to the position right above the reflective mirror 30 so that the light emitted from the light source 40 can be transmitted to the optical sensor 28 along the optical path 44. The selection of the light sources 26 or 40 can be controlled by using one of the push buttons 8 shown in FIG. 1. No matter which light source is selected, the frame 36 will always move in parallel with the frame 24 when scanning the document 18 so that no opaque panel is required for covering the document 18. A designer can also add an automatic light source selection mechanism to the scanner 10 to further facilitate the document scanning process. Such process can use the amount of light received by the optical sensor 28 to decide which light source should be use for scanning the document 18.

The above disclosure is not intended as limiting. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical scanner comprising:

(1) a base housing having a transparent top;

(2) an upper housing pivotally mounted on the base housing above the transparent top;

(3) a scanning mechanism movably mounted within the base housing for scanning an image-bearing document positioned on the transparent top; the scanning mechanism comprising a light source for emitting light to the document from underside, an optical sensor for transforming light into corresponding electric signals, and optical means for transmitting light reflected from the document along a predetermined optical path to the optical sensor; and (4) a reflective panel movably mounted within the upper housing which moves in parallel with the scanning mechanism for reflecting light transmitted through the document back to the scanning mechanism along the optical path so as to enhance the light received by the optical sensor.

2. The optical scanner of claim 1 wherein the upper housing further comprises a light source for emitting light to the document from above.

3. The optical scanner of claim 1 wherein the reflective panel is a white panel horizontally positioned above the document for reflecting light emitted from the light source of the scanning mechanism.

* * * * *